(12) United States Patent
Afriat

(10) Patent No.: US 7,227,464 B2
(45) Date of Patent: Jun. 5, 2007

(54) AUTO WAKE-UP METHOD FROM SLEEP MODE OF AN OPTICAL MOTION SENSING DEVICE

(75) Inventor: Gil Afriat, Monument, CO (US)

(73) Assignee: EM Microelectronic-Marin SA, Marin (CH)

( * ) Notice: Subject to any disclaimer, the term of this patent is extended or adjusted under 35 U.S.C. 154(b) by 204 days.

(21) Appl. No.: 11/170,071

(22) Filed: Jun. 30, 2005

(65) Prior Publication Data

US 2007/0001840 A1    Jan. 4, 2007

(51) Int. Cl.
*G08B 1/08*    (2006.01)

(52) U.S. Cl. .................. 340/539.13; 340/555; 340/566; 340/557; 250/221; 250/559.19; 356/28; 356/496

(58) Field of Classification Search ........... 340/539.13, 340/566, 555, 557; 250/221, 559.19; 356/28, 356/496

See application file for complete search history.

(56) References Cited

U.S. PATENT DOCUMENTS

| 5,469,141 | A | * | 11/1995 | Ghazarian | .................. | 340/566 |
| 6,043,734 | A | * | 3/2000 | Mueller et al. | ............. | 340/429 |
| 2005/0001153 | A1 | | 1/2005 | Lauffenburger et al. | | |

FOREIGN PATENT DOCUMENTS

WO    WO 03/049018 A1    6/2003

* cited by examiner

*Primary Examiner*—Tai Nguyen
(74) *Attorney, Agent, or Firm*—Sughrue Mion, PLLC

(57) ABSTRACT

There is described a method for waking up an optical sensing device from a sleep mode to a motion detection mode, the optical motion sensing device comprising a light source, a photodetector device, a motion sensing unit and a control unit, the motion detection mode being defined as a mode during which motion is detected between the optical motion sensing device and a portion of a surface illuminated by the light source at a defined flash rate being set between minimum and maximum flash rate values, the motion sensing unit sending motion reports to the control unit, the sleep mode being defined as a mode during which the flash rate is set to a low flash rate value being lower than the minimum flash rate value and no motion report being reported from the sensing unit to the control unit, wherein the method comprises during the sleep mode the steps of (i) illuminating said surface portion with radiation by means of the light source at the low flash rate value; (ii) detecting a radiation pattern reflected from the illuminated surface portion by means of the photodetector device; (iii) detecting occurrence of a loss-of-tracking event between two successive reflected radiation patterns detected by the photodetector device indicating the user has returned; (iv) increasing the flash rate if an occurrence of the loss-of-tracking event is detected; (v) entering into said motion detection mode.

4 Claims, 3 Drawing Sheets

AUTO WAKE-UP METHOD FROM SLEEP MODE OF AN OPTICAL MOTION SENSING DEVICE

FIELD OF THE INVENTION

The present invention generally relates to optical motion sensing devices, in particular for use in optical pointing devices. The present invention more particularly relates to a method of operating an optical motion sensing device as well as an optical motion sensing device implementing this method.

BACKGROUND OF THE INVENTION

Optical pointing devices are already known in the art. U.S. patent application Ser. No. 10/609,687, filed in the name of the same Assignee and enclosed in its entirety herewith by way of reference, for instance discloses, as shown in FIG. 1, an optical sensing system comprising a light source 10 for illuminating a portion of a surface S with radiation, a photodetector device 20 having at least one photosensitive element responsive to radiation reflected from the illuminated surface portion S, and a motion sensing unit 30, coupled to the output of photodetector device 20, for detecting and measuring displacement with respect to the illuminated surface portion S. During each period of activation, or flash, light source 10 is activated to illuminate surface portion S, photodetector device 20 is activated to capture an image or intensity pattern of the illuminated surface portion S and motion sensing unit 30 is activated to detect and measure the displacement with to the illuminated surface portion S based on a comparison of the intensity pattern detected by photodetector device 20 during a previous flash period. The rate at which activation of light source 10, photodetector device 20 and motion sensing unit 30 is repeated, is defined as the "flash rate". Motion sensing unit 30 outputs motion reports that are each representative of a magnitude of the detected displacement. The motion sensing device further comprises a control unit 40, which purpose is to adjust the flash rate (i.e. the rate of activation of light source 10, photodetector device 20 and motion sensing unit 30) as a function of the magnitude of the detected displacement. The motion reports from motion sensing unit 30 are thus fed to control unit 40 to provide a basis and reference for performing this adjustment of the flash rate. More particularly, control unit 40 is adapted to compare the magnitude of the detected displacement with a determined displacement threshold, designated $\Delta th$, and increase or decrease the flash rate if the magnitude of the detected displacement is respectively greater or lower than the displacement threshold $\Delta th$. Accordingly, if the displacement reported by the sensor is larger than the displacement threshold, the flash rate is increased (i.e. the time between flashes decreases) and if this reported displacement is lower than the threshold, the flash rate is decreased (i.e. the time between flashes increases).

The motion sensing device additionally includes a comparator array 50 which is coupled between photodetector device 20 and motion sensing unit 30. This comparator array 50 is used to extract so-called edge direction data from the intensity pattern detected by photodetector array 20, i.e. data that is descriptive of light intensity differences between neighbouring pixels of the photodetector array (a pixel designates one photosensitive element of the photodetector array). Edge direction data includes two types of edge direction conditions, namely a first edge condition, or positive edge, defined as a condition wherein the light intensity of a first pixel is less than the light intensity of a second pixel, and a second edge condition, or negative edge, defined as a condition wherein the light intensity of the first pixel is greater than the light intensity of the second pixel. Such edge direction conditions are defined between every pair of neighbouring pixels (not necessarily adjacent) of photodetector array 20 and are determined, as already mentioned, thanks to comparator array 50 which basically consists of a set of comparator circuits coupled to corresponding pairs of pixels within array 20. This edge direction data is fed by comparator array 50 to motion sensing unit 30 for further processing. In particular, according to the "Peak/Null Motion Detection" algorithm described in international application WO 03/049018 A1, filed in the name of the same Assignee and which is incorporated herein by reference, so-called edge inflection data is extracted from the edge direction data supplied by comparator array 50, this edge inflection data being descriptive of the succession of positive and negative edges along the first or second axis of the photodetector array and include a first inflection condition, or peak, defined as the succession, along the first or second axis, of a positive edge followed by a negative edge, and a second inflection condition, or null, defined as the succession, along the first or second axis, of a negative edge followed by a positive edge. In contrast to the previously mentioned edge direction data, an inflection condition, whether a peak or a null, does not appear systematically between two successive edge conditions. Besides peaks and nulls there also exist states where the direction of the detected edge does not change when looking at the succession of two edge conditions. According to this "Peak/Null Motion Detection" algorithm, motion is tracked by looking at the displacement of the edge inflection conditions between two successive flashes. The locations of the peaks and nulls are thus compared with the locations of the peaks and nulls detected from a previous flash in order to determine the direction and magnitude of displacement. The displacement is determined by comparing the location of each peak or null determined from a first flash with the locations, in the immediate vicinity, of similar peaks and nulls determined from another flash, i.e. locations that are within one pixel pitch of the detected peak or null. The result of the calculation is an indication of the direction and magnitude of displacement, along each axis of displacement, expressed as a fraction of the pixel pitch.

A "loss-of-tracking" event may occur if the sensor displacement speed is too great or if the sensor acceleration is too high, and may be identified, thanks to the "Peak/Null Motion Detection" approach, by looking at the number of so-called "ghost edge inflection conditions", i.e. edge inflection conditions that appear to come from nowhere. These "ghost edge inflection conditions" are identified as edge inflection conditions determined during a flash for which no similar edge inflection condition determined during another flash can be found at the same location or one pixel pitch around it. The number of these "ghost edge inflection conditions" can be tracked for each axe of the photodetector device and compared to a determined threshold. If the number exceeds the threshold, this can be identified as a loss-of-tracking event. The threshold is defined hereinafter as the "loss-of-tracking threshold" and designated as LOTth. Motion sensing unit 30 is supplying an additional parameter, designated $N_G$, to control unit 40, which parameter relates to the number of ghost edge inflections found during motion detection. Control unit 40 is also further adapted to compare this number $N_G$ with threshold LOTth and further increase the flash rate if the loss-of-tracking event occurs (when reported number $N_G$ is greater than threshold LOTth). When a loss-of-tracking event occurs, which situation should be regarded as exceptional, the flash rate is preferably increased directly to a maximum value in order to quickly regain track of the displacement.

For instance, in the embodiment of FIG. 1, detection of the occurrence of loss-of-tracking events is shown to be performed by control unit 40, motion sensing unit 30 providing to control unit 40 the number $N_G$ of detected ghost edge inflection conditions. Such detection may alternatively be embedded in motion sensing unit 30. In such case, motion sensing unit 30 would simply provide to control unit 40 an indication of the occurrence or non-occurrence of a loss-of-tracking event so as to allow appropriate adjustment of the flash rate.

Control unit 40 is further adapted to communicate in a bidirectional manner with a line interface 45 that communicates in turn with a host system (not illustrated). Cursor control signals (and eventually other signals related to the optical pointing device) are supplied to the host system. Control unit 40 may also receive information, such as configuration signals from the host system.

Tendency is to provide with wireless optical mouse in which one major care is to reduce as much as possible power consumption while keeping reliable performances. Current operating methods for such optical motion sensing device comprises a motion detection mode during which relative motion is detected between the optical motion sensing device and the illuminated surface portion and a sleep mode during which relative motion between the optical motion sensing device and the surface portion is no longer detected and then power consumption is reduced. In the existing prior art solutions, entrance into and exit from the sleep mode may be done manually by the user activating a switch provided on the optical motion sensing device. However such solution requires a positive action from the user which is constraining and do not prevent from power consumption excesses in case the user left the optical motion sensing device without switching it off. Another existing solution consists in automatically entering the sleep mode when reported motion is less than a minimum threshold under which the optical motion sensing device is considered to be at rest. In this sleep mode, the optical motion sensing device reduces its activity to the bare minimum needed to detect any incoming activities, i.e. when the user has returned, so it can wake up and resumes the motion detection mode. For that purpose, one existing method consists in using a periodic wake up of optical motion sensing device to check if the user has returned. It results in a difficult trade off between power consumption during sleep mode and response lag for resuming the motion detection mode once the user has returned. In fact, if the wake up period is set short, then power consumption grows accordingly and if it is set long, a response lag perceivable by the user appears.

The goal of the present invention is thus to implement a reliable method in such an optical motion sensing device to detect that the user has returned and to wake up as fast as possible, in order to prevent apparition of a response lag perceivable by the user. In the meantime, this method should also be as less costly in power as possible.

SUMMARY OF THE INVENTION

According to a first aspect of the invention, there is provided a method for automatically waking up an optical motion sensing device from a sleep mode to a motion detection mode, the optical motion sensing device comprising a light source, a photodetector device, a motion sensing unit and a control unit. The motion detection mode is defined as a mode during which motion is detected between the optical motion sensing device and a portion of a surface illuminated by the light source at a defined flash rate being set between minimum and maximum flash rate values, the motion sensing unit sending motion reports to the control unit. The sleep mode is defined as a mode during which said flash rate is set to a low flash rate value lower than said minimum flash rate value and no motion report being reported from the sensing unit to the control unit, wherein the method comprises during the sleep mode the steps of:
a) illuminating the surface portion with radiation by means of the light source at the low flash rate value;
b) detecting radiation reflected from the illuminated surface portion by means of the photodetector device;
c) detecting occurrence of a loss-of-tracking event between two successive reflected radiation patterns detected by the photodetector device indicating the user has returned;
d) increasing the flash rate if an occurrence of the loss-of-tracking event is detected;
e) entering into the motion detection mode.

Other aspects, features and advantages of the present invention will be apparent upon reading the following detailed description of non-limiting examples and embodiments made with reference to the accompanying drawings.

FIGURES

DETAILED DESCRIPTION OF THE INVENTION

Figure 2:
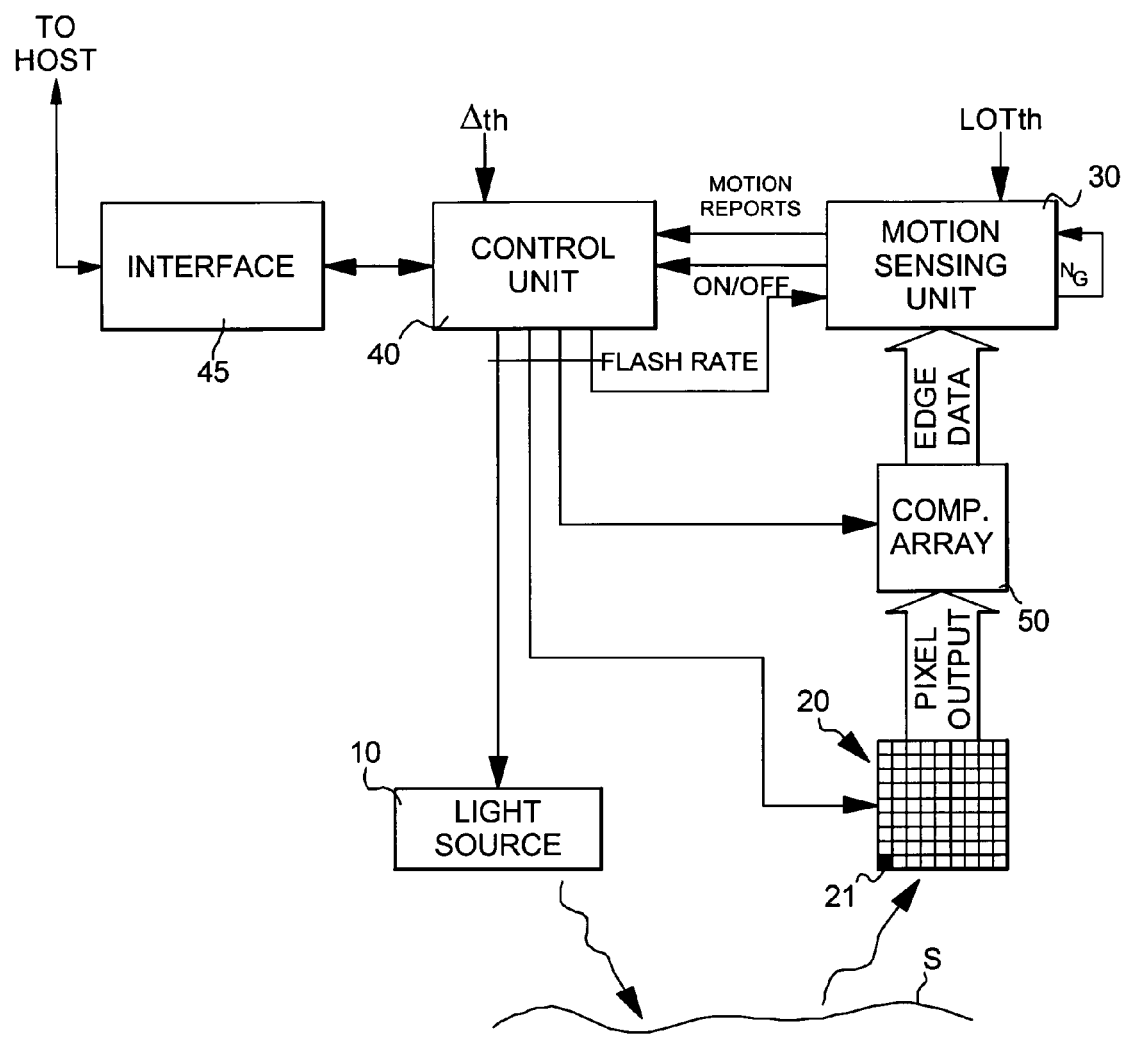
FIG. 2 is a schematic illustration of an optical motion sensing unit according to the present invention.

The following description of a preferred embodiment of the method for waking up an optical motion sensing device is given by way of a non limiting example in relation with the optical motion sensing device shown in FIG. 2.

Figure 1:
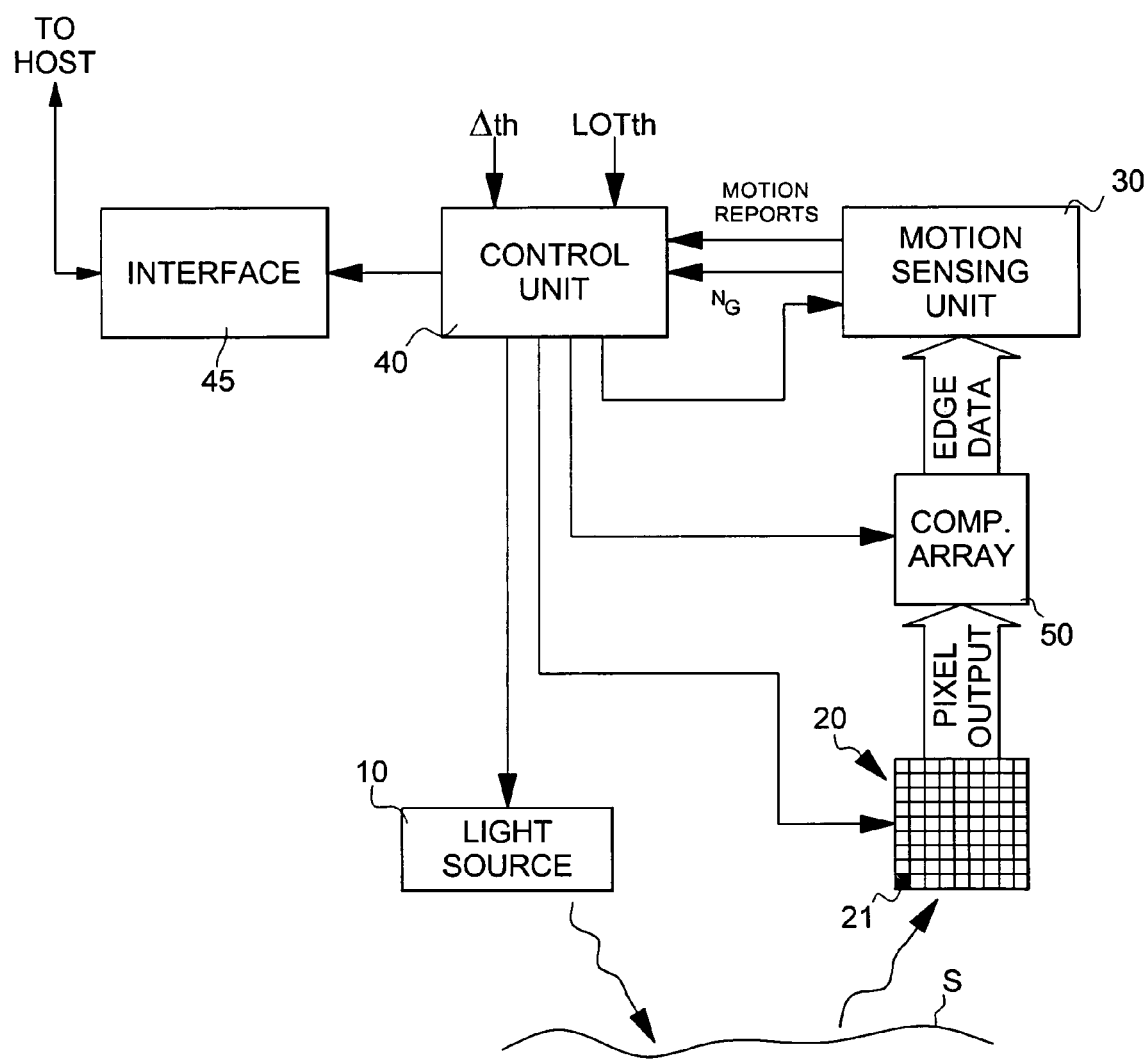
FIG. 1 is a schematic illustration of an optical motion sensing unit according to the prior art.

FIG. 2 is a schematic illustration of an optical motion sensing device according to the present invention. The same numeral references have been kept for the same elements with respect to FIG. 1. The main difference with the optical motion sensing device of the prior art mainly stays on communications between motion sensing unit 30 and control unit 40. Additionally to motion report signals, motion sensing unit 30 furnishes an ON/OFF control signal to respectively switch on or switch off control unit 40. Further, it should be noted that the loss-of-tracking threshold LOTth is supplied at motion sensing unit 30 and that the number of ghost inflections $N_G$ is both computed and compared with the loss-of-tracking threshold by means of motion sensing unit 30. One implementation of the waking up method will now be described in more details in relation with FIG. 3.

Figure 3:
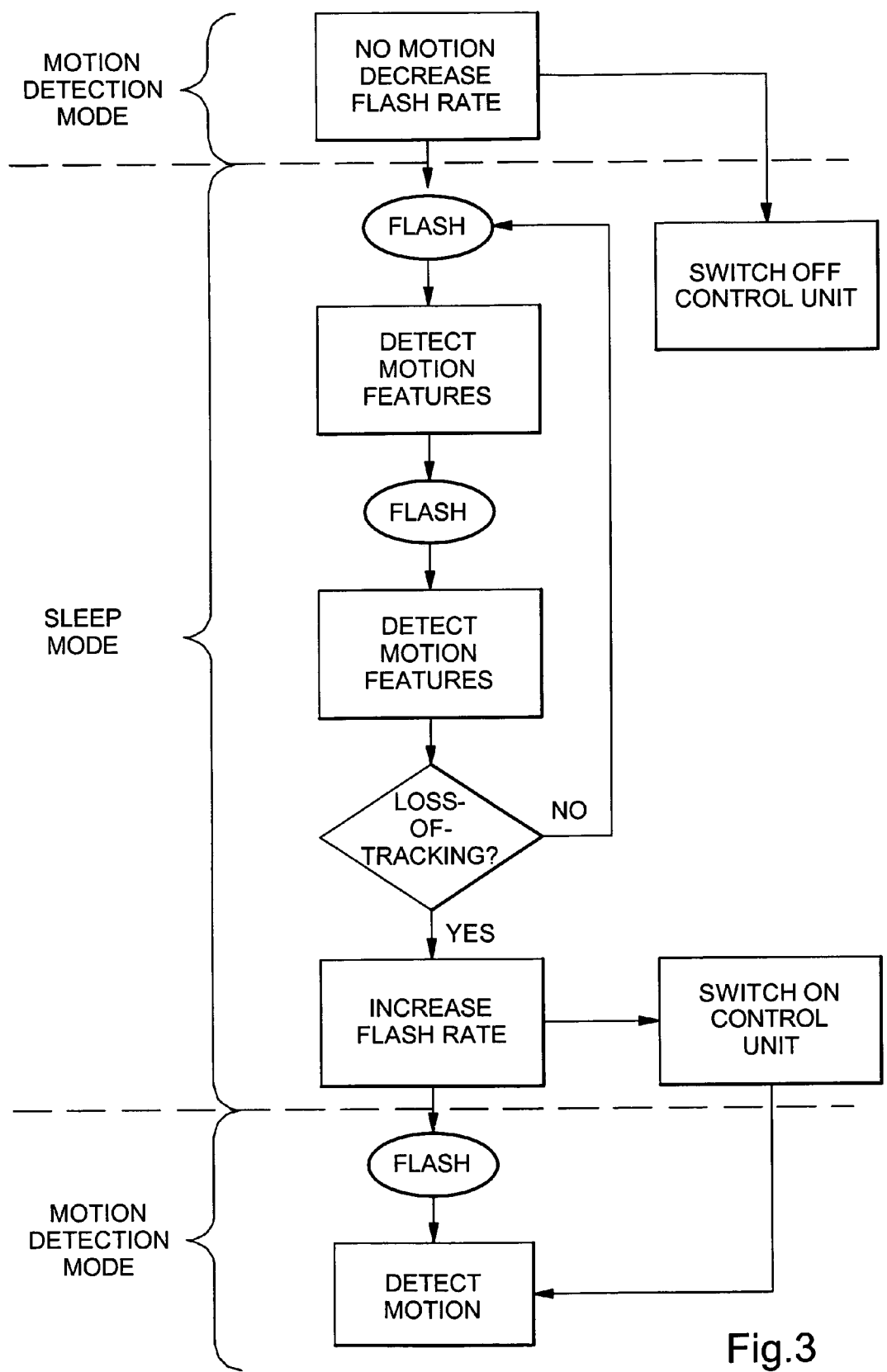
FIG. 3 is a flow chart showing the basic operations of the auto wake up method implemented by an optical motion sensing device within the scope of the invention.

FIG. 3 is a flow chart showing the basic operations of the auto wake up method according to the invention. First, it will be considered that the optical motion sensing device is operating in its motion detection mode. For detailed example of this operating mode, one may refer to the U.S. patent application Ser. No. 10/609,687 which is enclosed herewith by way of reference.

When no motion is detected, for instance when the magnitude of the detected displacement is lower than the determined displacement threshold Δth and when the flash rate has been decreased to its minimum value (i.e. the time between flashes is maximum), and that in the meantime no other user actions have been detected such as activation of a button, or rolling of a wheel, the optical motion sensing device enters a sleep mode. This sleep mode is defined as a mode in which power consumption is reduced.

Then during the sleep mode, the main goal of the present invention is to provide a method for on the one hand reducing as much as possible power consumption and on the other hand resuming the motion detection mode without perceivable response lag when the user has returned. For that purpose, the flash rate is further decreased to a low predetermined flash rate value being lower than the minimum flash rate value used during motion detection mode and therefore the light source consumes less energy as well as the motion sensing unit which is used for detecting motion features from reflected pattern on the photodetector array. Further, the control unit is advantageously switched off, since no motion report needs to be transmitted from the motion sensing unit to the control unit and further transmitted to the host system. For that purpose, the motion sensing unit sends a control signal OFF to the control unit when entering into sleep mode. Furthermore, the low predetermined flash rate is chosen so that the user may not perceive any response lag when he returns, for example such low flash rate value may be set at 4 Hz in comparison the minimum flash rate value during motion detection mode may be set for example at 40 Hz.

Thus according to the method for waking up the optical motion sensing device from the sleep mode to the motion detection mode, it is provided that during sleep mode, the light source continues to flash the surface portion at the low predetermined flash rate. Then, since the control unit is switched off, the motion unit detects motion features for each flash, for instance by means of the comparator array, but does not transmit motion reports to the control unit. Based on the last two motion features detections, the motion sensing unit checks if a loss-of-tracking occurrence has not occurred. Two checking approaches may be implemented. One approach may consist in comparing the evolution of motion features extracted from consecutive reflected patterns which might be eventually considered as spatial correlation. Another approach may consist in correlating consecutive patterns and determining motion from the differences, which technique is called time correlation.

In the following paragraphs, one will describe essentially a loss-of-tracking event in relation with the first approach for which motion features are extracted from each reflected pattern and then compared with motion features extracted from a subsequent pattern. However, it will be appreciated that a similar loss-of-tracking event may be defined according the second approach employing time correlation. Such a loss-of-tracking event may occur if the sensor displacement speed is too great or if the sensor acceleration is too high comparatively to the flash rate which is more or less representative of the optical motion sensing device sensibility for said determined flash rate. Thus a loss-of-tracking event is defined in a general manner by non related consecutive reflected patterns, which should be understood in the case of the first approach by non related extracted motion features from two consecutive patterns.

For instance, one specific implementation for detecting a loss-of-tracking event is given in the U.S. patent application Ser. No. 10/609,687 which is summarized herein below. A loss-of-tracking event may be identified, thanks to the "Peak/Null Motion Detection" approach, which is fully described in the International Patent Application No. WO 03/049018 filed in the name of the same Assignee and enclosed herewith by way of reference, by looking at the number of so-called "ghost edge inflection conditions", i.e. edge inflection conditions that appear to come from nowhere. These "ghost edge inflection conditions" are identified as edge inflection conditions determined during a flash for which no similar edge inflection condition determined during another flash can be found at the same location or one pixel pitch around it. The number of these "ghost edge inflection conditions" can be compared to a determined threshold. If the number exceeds the threshold, this can be identified as a loss-of-tracking event. The threshold is defined as the "loss-of-tracking threshold" and designated as LOTth. Motion sensing unit 30 is computing an additional parameter, designated $N_G$, which parameter relates to the number of ghost edge inflections found during motion detection. Motion sensing unit 30 is further adapted to compare this number $N_G$ with threshold LOTth and to resume the motion detection mode if the loss-of-tracking event occurs (when reported number $N_G$ is greater than threshold LOTth). When a loss-of-tracking event occurs during the sleep mode, it should be regarded as a return of the user since some activity is detected again. Advantageously in comparison with previous methods, the optical motion sensing device return in the motion detection mode very quick as it is the motion sensing unit which wakes up the control unit by sending an appropriate control signal ON to switch it on. In the meantime, the flash rate is increased at least to the minimum flash rate used during motion detection mode and preferably directly to its maximum value in order to quickly regain track of the displacement. Alternatively, it is to be noted that until no loss-of-tracking event is detected then the optical motion sensing device remains in the sleep mode.

Having described the invention with regard to a certain specific waking up method it is to be understood that this method is not meant as limitation of the invention. Indeed, various modifications and/or adaptations may become apparent to those skilled in the art without departing from the scope of the annexed claims.

What is claimed is:

1. A method for automatically waking up an optical motion sensing device from a sleep mode to a motion detection mode, said optical motion sensing device comprising a light source, a photodetector device, a motion sensing unit and a control unit, said motion detection mode being defined as a mode during which motion is detected between said optical motion sensing device and a portion of a surface illuminated by said light source at a defined flash rate being set between minimum and maximum flash rate values, said motion sensing unit sending motion reports to said control unit, said sleep mode being defined as a mode during which said flash rate is set to a low flash rate value being lower than said minimum flash rate value and no motion report being reported from said sensing unit to said control unit, wherein the method comprises during the sleep mode the steps of:
   a) illuminating said surface portion with radiation by means of the light source at said low flash rate value;
   b) detecting a radiation pattern reflected from the illuminated surface portion by means of the photodetector device;

c) detecting occurrence of a loss-of-tracking event between two successive reflected radiation patterns detected by the photodetector device indicating the user has returned;
d) increasing the flash rate at least to said minimum flash rate value if an occurrence of the loss-of-tracking event is detected;
e) entering into said motion detection mode.

2. The method according to claim 1, wherein the flash rate is directly increased to said maximum flash rate value if occurrence of the loss-of-tracking event is detected.

3. The method according to claim 1, wherein during the sleep mode the control unit is switched off and wherein before entering into said motion detection mode, the method further comprises the step of:

d2) sending a control signal from the motion sensing unit to the control unit to switch on the latter.

4. The method according to claim 1, wherein step b) consists in extracting motion features from said reflected radiation pattern and wherein step c) consists in detecting non related extracted motion features from two consecutive patterns.

\* \* \* \* \*